No. 872,195.  
PATENTED NOV. 26, 1907.

J. P. PAYNE.  
BOX MAKING MACHINE.  
APPLICATION FILED MAY 29, 1906.

Witnesses  
Inventor  
James P. Payne,  
By Victor J. Evans.  
Attorney

No. 872,195. PATENTED NOV. 26, 1907.
J. P. PAYNE.
BOX MAKING MACHINE.
APPLICATION FILED MAY 29, 1906.

PATENTED NOV. 26, 1907.

J. P. PAYNE.
BOX MAKING MACHINE.
APPLICATION FILED MAY 29, 1906.

Witnesses
Wm Koerth
D. W. Gould.

Inventor
James P. Payne,
By Victor J. Evans
Attorney

UNITED STATES PATENT OFFICE.

JAMES P. PAYNE, OF DELTA, COLORADO.

BOX MAKING MACHINE.

No. 872,195.　　　Specification of Letters Patent.　　　Patented Nov. 26, 1907.

Application filed May 29, 1906. Serial No. 319,381.

*To all whom it may concern:*

Be it known that I, JAMES P. PAYNE, a native-born citizen of the United States, residing at Delta, in the county of Delta and State of Colorado, have invented new and useful Improvements in Box-Making Machines, of which the following is a specification.

The invention relates to an improvement in box-making machines, consisting primarily in a machine designed for holding the sections of a wooden box to permit convenient and expeditious nailing.

The main object of the present invention is the production of a box-making machine in which the box sections are adapted to be automatically clamped in coöperative position to provide for the convenient securing together of such sections.

A further object of the machine is the provision of a box support or table arranged for independent movement relative to the structure, whereby to provide for conveniently positioning the box for the nailing operation, the table having an adjustable platform to accommodate boxes of different sizes.

The invention will be described in the following specification, reference being had particularly to the accompanying drawings, in which:—

Fig. 4 is a transverse section through the box-making machine, the nail delivery apparatus being shown in end elevation.

Referring particularly to the drawings, my improved box-making machine comprises a bed plate 1 of appropriate size and preferably supported upon legs 2. To provide the desired stability of structure and also to afford means for supporting the necessary operating parts, the legs 2 are connected by a cross bar 3 from which latter extend spaced parallel strips 4, secured at their upper ends to the bed plate. Aside from the particulars noted the supporting frame may be of any form desired, as such forms no material part of the present invention.

Figures 1, 6:
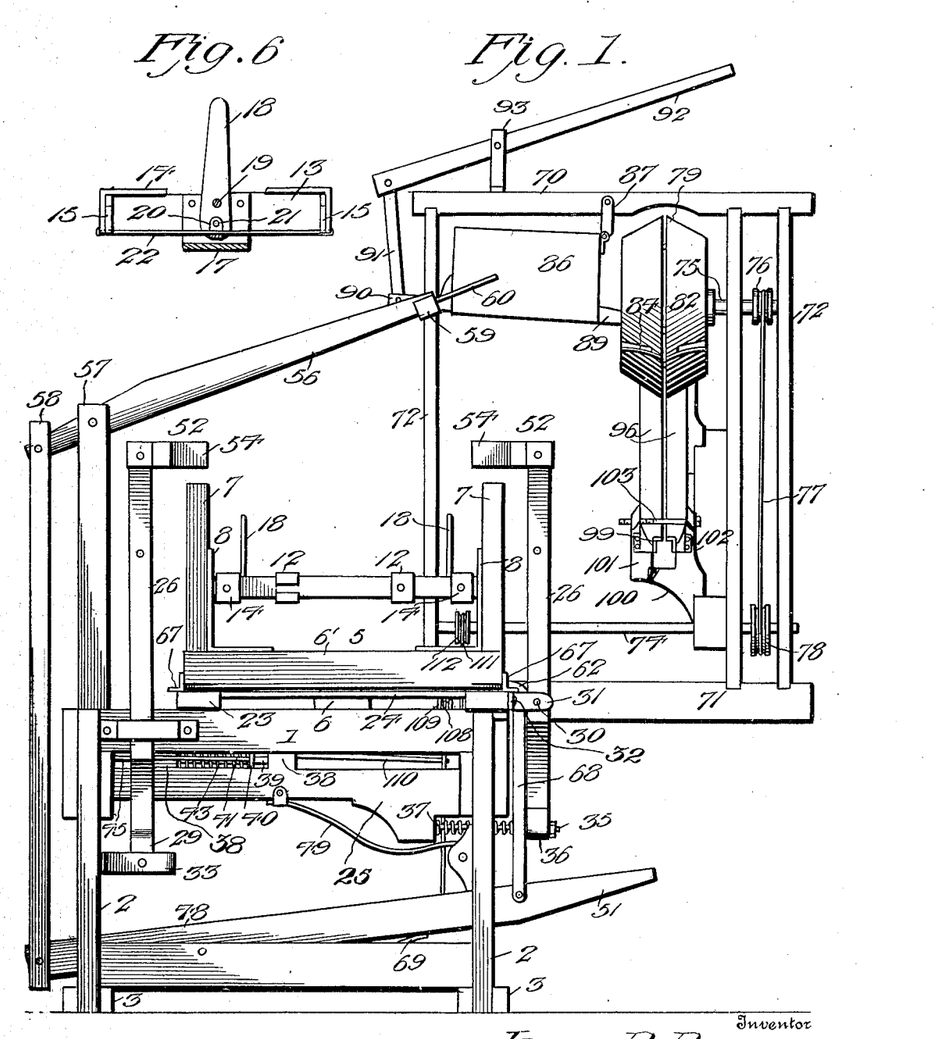
Figure 1 is a view in side elevation of a machine constructed in accordance with my invention.
Fig. 6 is a transverse section through the adjustable platform of the box table, illustrating particularly the box end supporting arms.

A box support or table 5 is rotatively supported on the table 1, being mounted upon a suitable bearing block 6 supported by the bed plate and so positioned relative to said plate that when the table is in position longitudinally of the bed plate, the forward edge of said table is in alinement with the forward edge of the plate, as clearly shown in Fig. 1. The table comprises a bottom 6' and end walls 7 extending upward from the bottom in alinement with the ends thereof. Angle plates 8 are secured to the end walls and bottom, said plates being respectively arranged adjacent the side edges of the bottom and end wall, whereby four of said plates are utilized and end walls are supported in fixed relation to the bottom. Each of the plates 8 is formed with a series of vertically alined slots 9, designed to provide for adjustably supporting the box platform, hereinafter described, said slots being of appropriate and in sufficient number to adapt the machine for conveniently handling boxes of practically all sizes.

The box platform arranged for adjustable connection with the table is of skeleton formation comprising side plates 10 and 11 slidably connected through the medium of keeper strips 12 secured to the respective ends of the side strips and bent to embrace the adjacent strip. The strips are connected in pairs near the ends opposite the connection of the keeper strips by cross bars 13 arranged on edge relative to the plane of the platform, and beyond said bars by strips 14 arranged approximately in a plane with the supporting plane of the platform, and serving as a support for the end sections of the box, these strips 14 being hereinafter termed box rests. The lower edges of the free ends of the strips 11 and 12 beyond the box rests are suitably recessed to provide hooks 15 designed to engage the lower wall of the slots 9 in the angle plate and support the platform as a whole at the desired height relative to the bottom of the table. In connection with the slots in the angle plates I prefer to recess the end walls of the table in alinement with said slots, as at 16, to provide for the reception of the hook ends of the platform, as clearly shown in Fig. 3. A U-shaped bracket 17 is secured to the relatively forward sides of each of the cross bars 13, said brackets directly underlying the box rests. Holding arms 18 are pivotally supported at their lower ends on pins 19 journaled in the walls of the bracket, whereby to provide a relatively pivotal movement of said arm, the box rest and cross bar 13 being spaced apart to provide for the projection of the arm between them. The arm depends below the pivot pin 19 and supports a U-shaped frame 20 through the medium of a pivot pin 21, said frame being disposed on the relatively forward side of the arms, and between said arms and the forward branch of the bracket. A spring bar 22 is disposed in the frame 20, normally bearing against the cross bar thereof, the ends of said bar 22 being seated in notches formed in the side bars of the platform. The spring bar is so disposed that in normal tension it bears upon the cross bar of the U-frame and so maintains the arm 18 in elevated position, while at the same time permitting the depression of said arm into a plane with the box rest, said depression abutting the spring bar under greater tension and thereby enabling said spring bar to return the arm to normal position upon release of the holding pressure. As thus constructed the platform comprises in effect duplicate frames slidably connected to provide for adjusting the length of the platform, by which adjustment the hooks of the platform may be inserted in the slots in the angle plates to provide for supporting the platform at varying heights relative to the bottom of the table.

For use in connection with the table I provide clamping means for properly supporting and holding the respective sections of the box during the nailing operation. To this end I secure upon the bed plate a cross frame including side strips 23 and cross strips 24, said strips being disposed on the bed plate in alinement with the ends of the table when the latter is in normal position, the ends of the strips projecting beyond the side edge of the table to provide a support for the nail delivery apparatus, as hereinafter described. In the main frame of the structure immediately below the bed plate I mount for movement a slide bar 25, the ends of which are preferably supported and guided in suitable openings formed in the frame. Operatively connected with the slide bar are what I term the clamping frames 26 and 27, the former being disposed at the forward end of the bed plate while the latter is mounted adjacent the rear end thereof. The frames are practically duplicates, each comprising spaced arms 28 of somewhat greater length than the height of the end walls 7 of the table, said arms preferably converging at their lower ends and bent to form a centrally arranged connection 29. The forward frame is pivotally supported, at the juncture of the straight portion of the arms 28 with the inwardly bent portions, upon a pivot rod 30 passing through spaced ears 31 of brackets 32 secured to the forward cross bar 23 of the frame underlying the table, said pivot rod preferably extending wholly across the forward end of the bed plate, for a purpose hereinafter described. The rear frame is pivotally supported through the mounting of its connection 29 between the arms 33 of a bracket projecting from the space bars 4 between the rear legs of the main frame, the arms 28 of the rear frame being so spaced apart as to be disposed on opposite sides of the bed plate, suitable guides 34 being secured to the bed plate to receive and limit movement of the arms 28. A slide bar 25 is provided with an offset 34 in which is fixed the rear end of a rod 35, which extends forwardly and passes through an eye formed in the connection 29 of the forward clamping frame, the end of the rod beyond said eye being provided with a nut or similar means to prevent disconnection of the parts. A spring 37 is coiled about the rod 35 bearing at its opposite ends against the eye 36 and the offset 34, by which construction the clamping frame is adapted for movement under the influence of the slide bar but is capable of a slight independent yielding under excessive pressure, as will later appear. Spaced projections 38 project from the upper side of the slide bar near the rear end thereof, in which projections is fixed a rod 39. A head 40 is slidably mounted on the rod, the opposite ends thereof being connected by rods 41 to the cross bar 42 uniting the arms of the rear clamping frame immediately below the bed plate. A spring 43 encircles the rod 39 bearing against the rear projection and against the head 40. The rear frame is thus movably and yieldingly connected to the slide bar. A casing 44 is fixed in the main frame slightly above the rear end of the slide bar, in which is mounted for longitudinal movement a rod 45 connected at its forward end to the cross bar 42 of the rear clamping frame and provided on its rear end with a head 46, between which head and the forward end of the casing is arranged a coil spring 47. Through the medium of the spring the slide bar is actuated in a rearward direction, as will be obvious.

For positively moving the slide bar in a forward direction I pivotally mount a lever 48 in the lower part of the main frame and connect said lever to the slide bar through the medium of flexible connection, as a strap 49. The strap is terminally connected to the bar and lever respectively and is passed over a roller 50 journaled in the fixed part of the frame above the lever, whereby the depression of the lever by means of the forwardly projected treadle end 51 will force the slide bar in a forward direction.

As the forward clamping frame is pivotally supported above the slide bar and the rear clamping frame pivotally supported below said bar, movement of the bar in any one direction causes a reverse movement of the frames, the particular construction being such that in the movement of the bar in a forward direction the upper ends of the frames are caused to approach each other, while a movement of the bar in a rearward direction will cause the upper ends of the frames to recede from each other.

In normal position, which is in the fully retracted position of the slide bar, the respective clamping frames are vertically disposed, being respectively spaced slightly beyond the end walls of the table. The upper end of the arms of the respective clamping frames is provided with a clamping jaw 52, comprising a connector 53 secured to the upper end of the arm and provided at its free end, which projects toward the table with jaws 54 and 55, the former projecting at a slight incline to the longitudinal plane of the table, while the latter extends approximately parallel with the transverse plane. These jaws are designed to embrace the end pieces of the box and hold the same in proper position during the nailing operation, as will later appear.

The clamping frames 26 and 27 constitute the end clamps of the box structure, and in connection with such frames I arrange a top clamp 56, comprising a bar of suitable length pivoted near its rear end upon a standard 57 rising from the bed plate in rear of the table, the end of the bar 56 beyond the standard being connected to the rearwardly projecting end of the operating lever 48 through the medium of a bar 58. The bar 56 is of a length to arrange its free end, when in operative position, slightly in rear of the relatively forward wall of the table, said free end of the bar being provided with a cross strip or head 59 serving as a lateral projection of the bar to provide for an extended contact upon the box structure. The head 50 is provided with forwardly projecting fingers 60, arranged in spaced parallel relation and disposed with their contacting surfaces above the plane of the contacting surface of the head, whereby to provide for engaging a cleat of the box structure, as will later appear.

As the table is designed to support the box during the nailing operation, it is obvious that means must be provided for locking said table in fixed relation to the bed plate to provide against independent movement during such operation. It being also desirable to revolve the table to permit the positioning of different sections of the box convenient to the operator, it is also necessary that such lock be arranged to automatically release the table at a predetermined period in the operation of the machine.

Figures 3, 5:
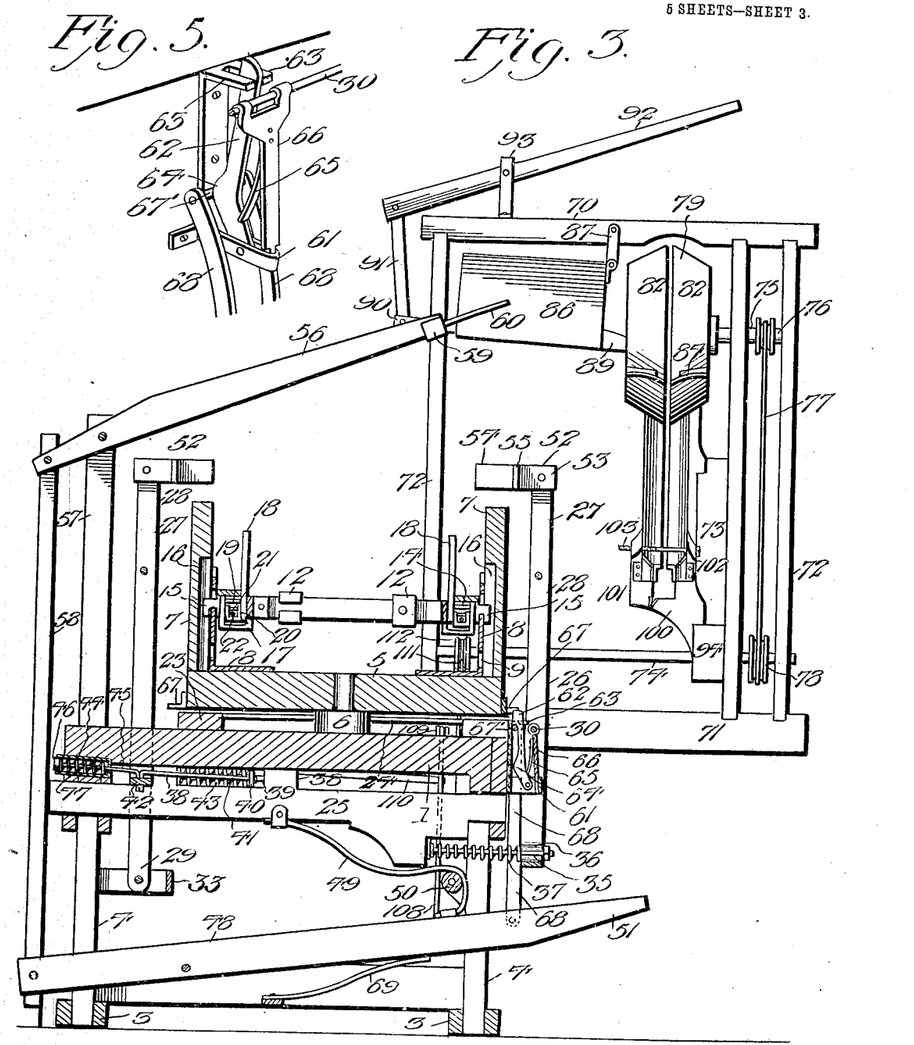
Fig. 3 is a longitudinal section through the box-making machine, the nail delivery apparatus being shown in elevation.
Fig. 5 is a perspective detail illustrating the box table lock.

The preferred form of lock of the present invention is particularly illustrated in Fig. 5, wherein 61 represents a bracket projecting from the main frame of the machine slightly below the forward end of the bed plate, in which bracket is pivotally supported a latch 62, the free or upper end of which projects above the plane of the bed plate and is guided between arms 63 fixed to the main frame. The latch is provided on its inner edge above the pivotal connection with the rounded projection 64, and is normally maintained in operative or latching position through the medium of a leaf spring 65 secured to the plate 66 connected at the upper end with the pivot rod 30 of the forward clamping frame and at the lower end with the bracket 61, the free or lower end of the spring bearing against the rear edge of the latch above the pivot. The ends of the table are each provided with a keeper 67 formed with a centrally arranged notch for the reception of the free end or nose of the latch, said notch being preferably formed in a laterally projecting flange of the keeper, the edges of which beyond the notch curve toward the plane of the keeper, whereby to provide for an automatic movement of the latch and keeper as the table is moved to proper position. The latch is arranged for automatic operation in the movement of the treadle lever by a bar 67' connected by strips 68 with said lever, the bar moving in contact with the rear edge of the latch during the operation of the lever. As said bar 67' engages the projection 64 of the latch, the latch will be forced out from operative position against the tension of the spring 65, the extent of movement of the latch under this operation being sufficient to disengage it from the keeper. In this connection it is to be particularly noted that the projection 64 of the latch is disposed intermediate the ends thereof, and that the parts are so arranged that at a predetermined point only in the movement of the lever will the latch be automatically disengaged from the keeper, and that in either extreme position of the lever the bar 67' will be free from engagement with the projection of the latch and, therefore, will be without effect upon the movement of the latch. The lever 48 is returned to normal or elevated position through the medium of spring 69 secured to the fixed part of the frame and bearing beneath the lever, as clearly shown in Fig. 3. In connection with the box-making machine above described I arrange a nail delivery apparatus specifically constructed and arranged to be operated in the movement of the treadle lever and adapted in operation to deliver nails or other fastening means to a point convenient to the operator of the box-making machine.

Figures 7, 8:
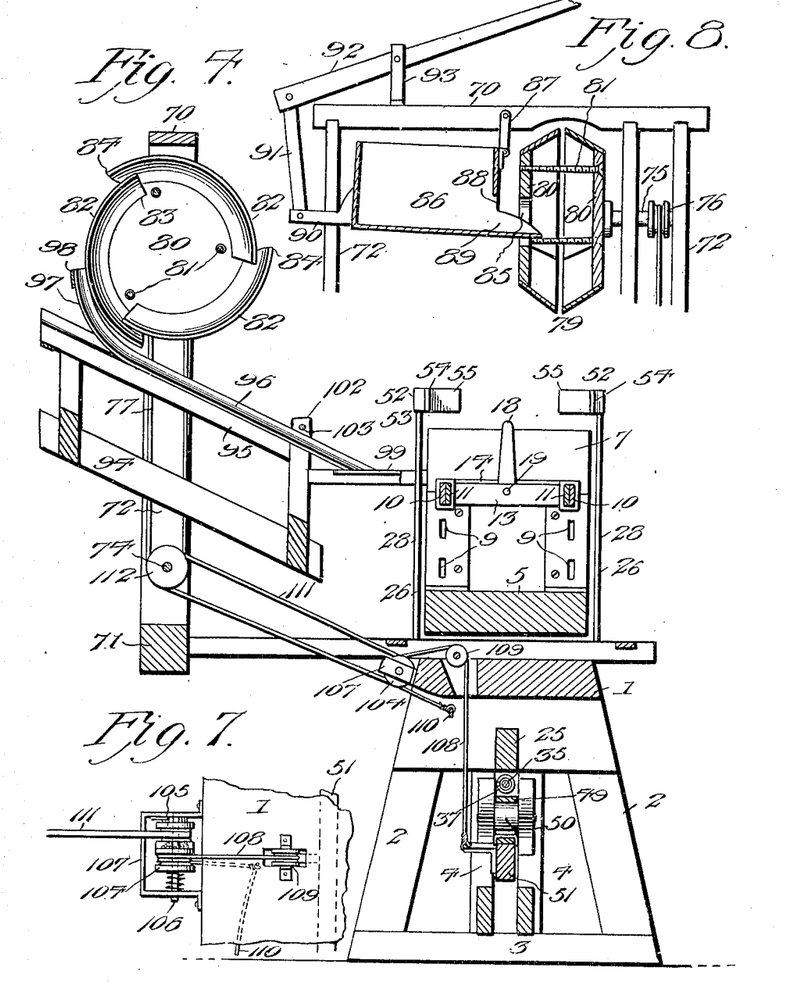
Fig. 7 is a broken plan of a portion of the machine illustrating the means for operating the nail delivery apparatus in the operation of the box-making machine.
Fig. 8 is an elevation, partly in section, of a portion of the nail delivery mechanism.
Figure 9:
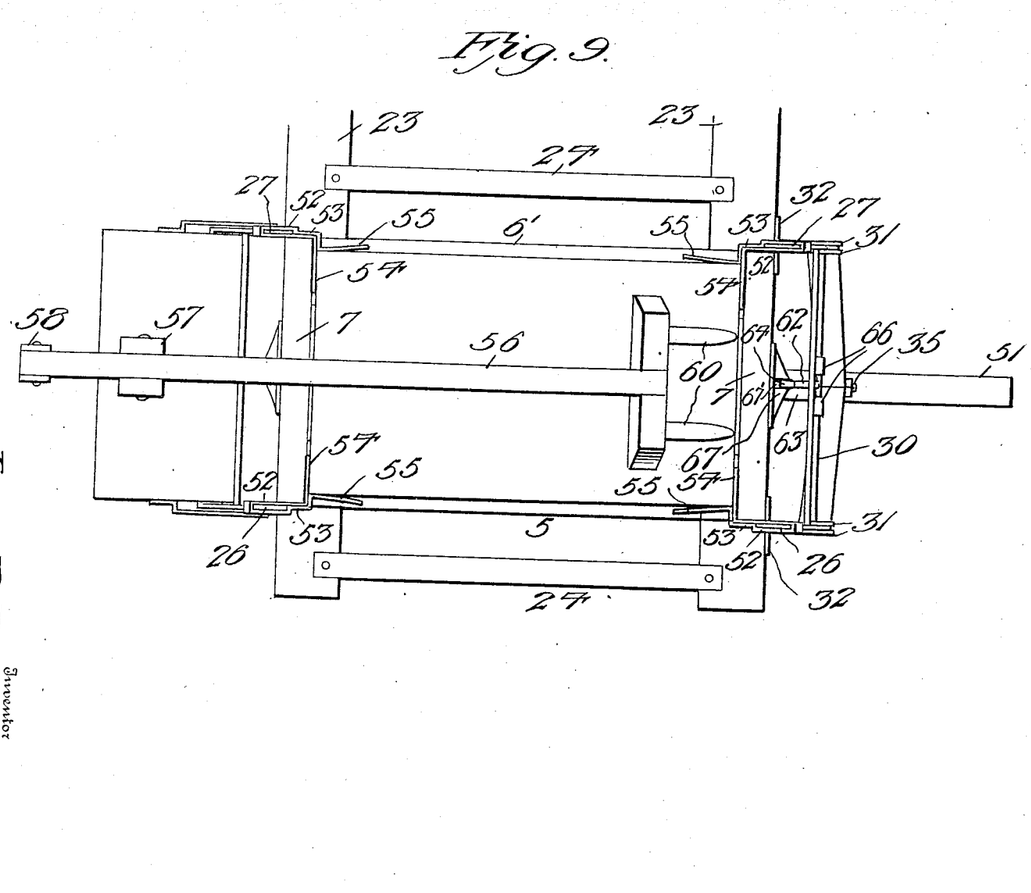
Fig. 9 is a plan of the box making machine constructed in accordance with my invention.

The nail delivery apparatus comprises a framework including upper and lower cross bars 70 and 71 and connecting bars 72, the latter being arranged in parallel relation and forming with the cross bars a rectangular frame, a supporting bar 73 being disposed adjacent and in parallel relation to one of the connecting bars to provide for supporting the operating parts of the delivery apparatus. A drive shaft 74 is mounted in the connecting bars and supporting bar, being arranged transverse the frame and driven in the operation of the lever, as will hereinafter appear. Above and in alinement with the drive shaft is arranged a driven shaft 75 supported in the connecting bar 72 and supporting bar 73, being provided between said bars with a belt pulley 76 connected through the medium of a belt 77 with the belt pulley 78 mounted on the drive shaft, whereby to transmit movement to the driven shaft. The end of the driven shaft between the supporting bar and the remote connecting bar is provided with a feed drum 79, comprising disk heads 80 adjustably connected through the medium of transversely arranged screw rods 81, it being understood that one of said heads is supported by the driven shaft, while the other head is supported from the first head by the screw rods, as clearly shown in Fig. 8.

The drum is of peculiar construction comprising in its peripheral surface three sets of plates 82 arranged in pairs transverse the drum. The combined lengths of the plates is greater than the circumferential extent of the drum, each pair of plates being secured at one end, as 83, to the drum at a fixed distance from the center thereof, and curving from said fixed point eccentric to the drum so that their free ends 84 are disposed at a greater radius from the center of the drum than their fixed ends. As the plates together are of greater length than the circumferential extent of the heads, the free ends of said plates will, therefore, overlie the fixed ends of the succeeding pairs of plates, and owing to the difference in relative distances from the center of the heads to said fixed and free ends of the plates, the latter will be spaced beyond the fixed ends in the direction of rotation of the drum. The plates of each pair are arranged at an angle to the axis of the drum, and are without connection with each other, being secured at their outer edges to the drum heads and wholly free at their inner edges. The heads are designed for adjustment so as to dispose the free edges of the respective plates a distance apart sufficient to receive the body of a nail or other fastening means, the head thereof being supported by engagement with the inner surfaces of the plates, in an obvious manner. As thus constructed the circumference of the drum is formed of outwardly inclined plates spaced apart to provide an annular way, the plates being so arranged as to provide said way with three discharge points, at which points the nail may be free from connection with the drum.

The head 80 of the drum remote from the supporting bar 73 is formed with a centrally arranged opening 85, and adjacent said head the nail receptacle 86 is supported from the upper cross bar 70 of the frame through the medium of the link 87 depending from said cross bar and connected at the forward end of the receptacle. The forward wall of the receptacle, that is the wall adjacent the drum is provided with an outlet 88 with which communicates a feed way 89 formed integral with the receptacle and terminating at its free end within the drum, being projected through the opening 85. The opposite end of the receptacle is provided with a rearwardly projecting arm 90 connected by a link 91 to the rear end of the lever 92, pivotally supported upon a stud 93 rising from the upper cross bar 70, the free end of the lever extending forward within convenient reach of the operator. By this construction operation of the lever will serve to elevate the rear end of the nail receptacle and discharge the nails contained therein into the drum. A supporting bar 94 is connected intermediate its ends to the bar 73 of the frame, being disposed in vertical alinement with the drum and arranged at an angle to the plane of the frame, inclining downwardly, as shown. The supporting bar 94 is arranged to support a nail chute comprising spaced bars 95 upon the upper surface of which is secured metallic strips 96, the supporting surface of the bars inclining downwardly toward each other to provide the desired central depression of the chute. At the rear end the strips 96 curve upwardly from the bars 95, as at 97, and are connected at their rear ends by a cross strip 98. The curved portion of the strips 97 is so arranged as to dispose this portion of the strip beneath and in proximity to the drum, the curvature being on a less radius than the curvature of the plates 82 so that the free rear end of the strips will just escape contact with the free ends 84 of the drum plates in the operation of the drum. As the space between the drum plates and that between the strips 96 is in vertical alinement the nails depending from the drum plates will in the revolution of the drum be projected between the strips, with the effect to cause said nails to engage the cross bar 98 in the revolution of the drum and withdraw the nails from the discharge ends of the drum plates, permitting the nails to gravitate down the chute. At the delivery end the chute is provided with tongues 99 projecting from each of the bars 95 and disposed horizontally or at right angles to the plane of the frame, providing for receiving the nails finding their way down the chute and supporting the same in convenient position to be withdrawn by the operator, as will be clearly apparent from the drawings. The strips 95 of the chute are preferably supported from the bar 94 through the medium of blocks 100 terminally secured to the bar 94 and including spaced arms 101 and 102. By preference these arms extend above the bars 95 and are connected at the upper ends by an adjusting rod 103, one of the arms, as 101, having a hinged connection with the blocks 100, whereby to permit the adjustment of the way between the blocks to accommodate nails of different sizes, as will be obvious.

Figure 2:
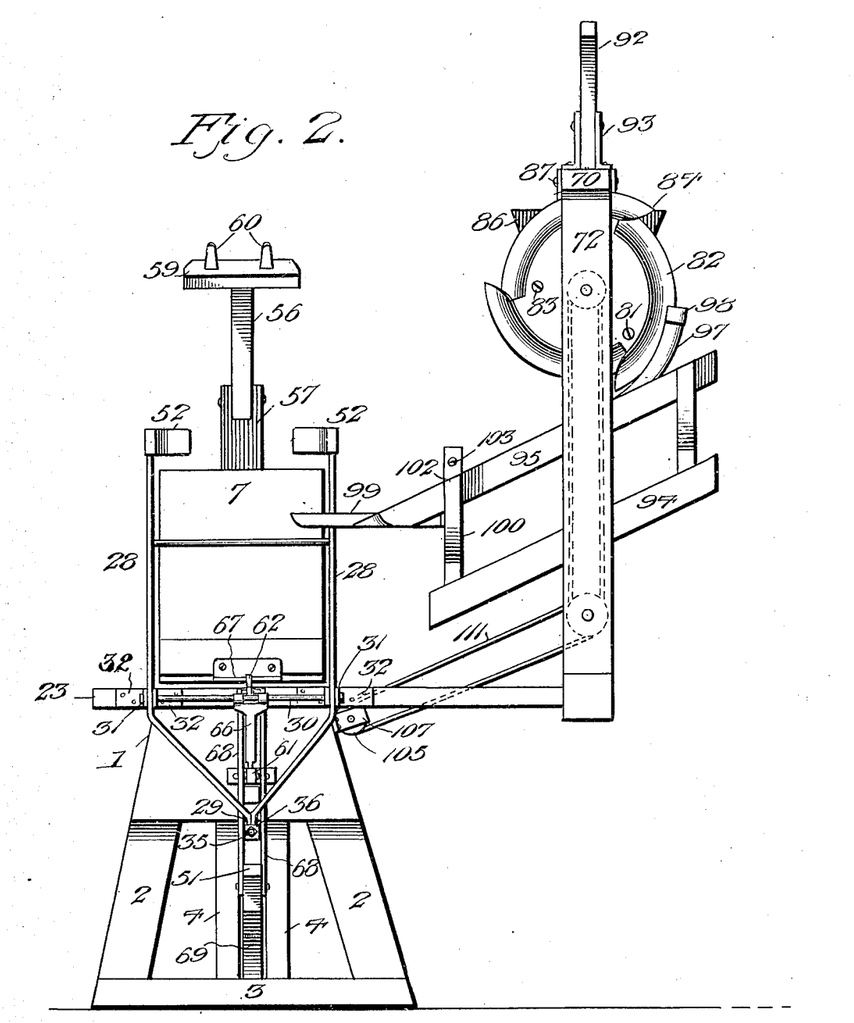
Fig. 2 is an end elevation of the same.

The nail delivery apparatus is operatively supported from the box-making machine by securing the lower cross bar 71 of such apparatus on the extensions of the bars 23 of the cross frame, the arrangement being such as to dispose the free ends of the tongues convenient to the operator of the machine, as clearly shown in Fig. 2.

The nail delivery apparatus is operated in the operation of the box-making machine through the medium of belt pulleys 104—105, supported on the shaft 106 mounted in a bracket 107 fixed to the side of the bed plate adjacent the nail delivery apparatus. The pulleys are arranged by any preferred form of structure for clutching engagement, in such manner that revolution of the pulley 104 in one direction will drive the pulley 105 in the same direction, a reverse operation of pulley 104 being without effect on pulley 105. Pulley 104 is operated in the movement of the treadle lever 51 through the medium of a flexible connection 108 secured at one end to the lever and passing over an idler 109 mounted in the bed plate, said connection extending from the idler about the pulley 104 and from said pulley to the leaf spring 110 secured beneath the bed plate. By this construction pulley 104 is driven in one direction on a depression of the treadle lever and in the opposite direction by the spring 110, the connection 108 being preferably wound twice about the belt pulley 104 to insure operation thereof. Pulley 105 is connected through the medium of a belt 111 to a belt wheel 112 mounted on the drive shaft 74 of the delivery apparatus. The clutch connection between pulleys 104 and 105 is such that the operative movement of said pulley in the operation of the treadle lever provides the driving movement for the pulley 105, the reverse movement of the pulley 104 under influence of the spring 110 being without effect on the pulley 105.

Assuming the parts constructed and arranged as described and the platform adjusted with relation to the table to suit the particular size of the box being made, the box ends are placed upon the rests 14 of the platform between the arms 18 and the end wall of the table. A side of the box is now placed upon the upper edges of the ends and the treadle lever 51 depressed, with the effect to bring the end clamping frames 26 and 27 into operative position to grasp the ends and the top clamping bar 56 down upon the top. The downward movement of the lever also serves, as hereinbefore described, to feed a number of nails in position between the tongues 99, convenient to the operator. The end of the side nearest the operator is secured to the box end by nailing, after which the treadle is slightly released to cause the bar 67' to engage the projection 64 of the latch and withdraw the latter from the keeper. The table is now revolved to present the opposite end of the box toward the operator, the treadle lever being meanwhile wholly released. As the table assumes the new position, the latch engages the keeper at the particular end of the table with the effect to lock the table in proper relative position. The lever is again depressed to move the clamping frame and arm into operative position and the unconnected end of the box structure is secured by the nails. The box structure is now reversed in position, with the applied side lowermost. This position of the box forces down the arms 18 into a plane with the box rests. The second side of the box is applied and the machine operated, as previously described, to permit the securing of said side in position. The box is now turned to present one of the open sides uppermost, and the top of the box applied. The top, in one or more pieces, is secured to the exposed edges of the ends, and ordinarily in boxes of this type overlying cleats are positioned adjacent the ends of the top. The top, in one or two pieces, is applied in position and the cleats also properly positioned. The lever is now depressed with the effect to clamp the box in place, the fingers 60 of the top clamping bar bearing upon and holding the cleat in applied position during the operation of nailing. After securing one end of the top the table is released and turned to present the opposite end to the operator, and the end of the box top adjacent the approximtae end of the table in the new position is secured. The box is thus completed being, as will be understood, filled from the bottom in packing and the bottom applied after completion of the packing.

In the operation of the machine described it is obvious that the sections of the box are through the medium of the clamping frames and arm held in relatively adjusted position to provide for a convenient and expeditious nailing without possibility of any of the box sections assuming any other than a proper relative position.

The machine is primarily adapted for fruit boxes, being constructed to permit the proper assemblage of boxes of various sizes through the adjustment of the box platform.

Having thus described the invention what is claimed as new, is:—

1. A box-making machine comprising a main frame, a table rotatably mounted thereon, a vertically adjustable platform connected with the table, and means carried by the platform for supporting the end sections of a box structure.

2. A box-making machine comprising a main frame, a table rotatably supported thereon, a vertically adjustable platform connected to the table, and spring arms carried by the platform and adapted to support the end sections of the box structure.

3. A box-making machine comprising a main frame, a table rotatably supported thereon, a vertically adjustable platform connected to the table, and supporting arms carried by the platform, said arms being normally spring held in operative position.

4. A box-making machine comprising a main frame, a table rotatably supported thereon, a vertically adjustable platform connected to the table, and supporting arms carried by the platform, said arms being normally spring held in operative position and arranged for free movement in either direction to dispose said arms below the supporting plane of the platform.

5. A box-making machine comprising a main frame, a table rotatably mounted thereon, a longitudinally adjustable platform supported on the table, means for supporting the platform to permit its vertical adjustment with relation to the table, edge clamping means supported on the frame, and a lever for operating said clamping means.

6. A box-making machine comprising a main frame, a table rotatably supported thereon, a platform supported on the table, edge clamping means mounted on the frame, a top clamping means carried by the frame, and a single lever for simultaneously operating said clamping means.

7. A box-making machine comprising a main frame, a table rotatably mounted thereon, clamping means for coöperation with the table, locking means to secure the table in fixed relation to the main frame, and a lever for operating the clamping means and simultaneously releasing the table from the locking means.

8. A box-making machine comprising a main frame, a table rotatably mounted thereon, clamping means for coöperation with the table, locking means to secure the table in fixed relation to the main frame, and a lever for operating the clamping means and simultaneously releasing the table from the locking means, said lever effecting the locking means at a point intermediate its limits of movement.

9. A box-making machine comprising a main frame, a table rotatably mounted thereon, a top clamping means supported on the frame, a lever for operating said means, and cleat holding members projecting from the clamping means.

In testimony whereof, I affix my signature in presence of two witnesses.

JAMES P. PAYNE.

Witnesses:
 BYRAM LUCE,
 PEARL A. CRAWFORD.